United States Patent
Park et al.

(10) Patent No.: US 7,420,306 B2
(45) Date of Patent: Sep. 2, 2008

(54) BRUSHLESS DC MOTOR

(75) Inventors: Sang Hoon Park, Suwon-Si (KR); Hyung Chul Lee, Gunpo-Si (KR); Sang Yong An, Suwon-Si (KR); Chun Mo Sung, Hwasung-Si (KR); Yun Seok Kim, Suwon-Si (KR); Bum Young Byun, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 11/229,552

(22) Filed: Sep. 20, 2005

(65) Prior Publication Data

US 2006/0208593 A1    Sep. 21, 2006

(30) Foreign Application Priority Data

Mar. 21, 2005    (KR) .................. 10-2005-0023179

(51) Int. Cl.
*H02K 1/22* (2006.01)
*H02K 1/27* (2006.01)

(52) U.S. Cl. ................................ 310/156.57

(58) Field of Classification Search ..............
310/156.45–156.57, 162, 165
See application file for complete search history.

(56) References Cited

U.S. PATENT DOCUMENTS

| | | | | |
|---|---|---|---|---|
| 4,658,165 A | * | 4/1987 | Vanderschaeghe | 310/156.57 |
| 5,672,926 A | * | 9/1997 | Brandes et al. | 310/181 |
| 7,105,971 B2 | * | 9/2006 | Asai et al. | 310/156.53 |
| 2006/0145556 A1 | * | 7/2006 | Aota et al. | 310/156.53 |

FOREIGN PATENT DOCUMENTS

| JP | 2002-84693 | | 3/2002 |
|---|---|---|---|
| JP | 2004104962 A | * | 4/2004 |

* cited by examiner

*Primary Examiner*—Tran Nguyen
(74) *Attorney, Agent, or Firm*—Stanzione & Kim, LLP

(57) ABSTRACT

A brushless DC motor prevents disconnection of a magnetic flux and to minimize leakage of the magnetic flux, thereby reducing torque ripple. A plurality of magnetic flux-disconnection preventing holes are arranged in an outer periphery of a rotor core between installing holes into which magnets are fitted. The plurality of magnetic flux-disconnection preventing holes are symmetrical at both sides about a first line connecting a center of the rotor core to a center between the adjacent installing holes, and an angle between the first line and a second line connecting the center of the rotor core to an outermost end of the plurality of magnetic flux-disconnection preventing holes is about 15~20°. A length between an outer periphery of the rotor core and an outer periphery of the plurality of magnetic flux-disconnection preventing holes is smaller than a gap between the rotor core and the stator.

16 Claims, 5 Drawing Sheets

BRUSHLESS DC MOTOR

CROSS-REFERENCE TO RELATED APPLICATIONS

This application claims under 35 U.S.C. §119 the benefit of Korean Patent Application No. 2005-23179, filed on Mar. 21, 2005 in the Korean Intellectual Property Office, the disclosure of which is incorporated herein by reference.

BACKGROUND OF THE INVENTION

1. Field of the Invention

The present general inventive concept relates to a brushless DC motor, and more particularly, to a brushless DC motor to reduce torque ripple, thereby reducing vibration and noise and enhancing an operating efficiency.

2. Description of the Related Art

Generally, motors are used in various electronic products to generate a rotational driving force. The motors include a brushless DC motor which can be reduced in volume and weight and can be easily controlled in its speed.

A conventional brushless DC motor disclosed in Japanese Patent Laid-open Publication No. 2002-84693 comprises a stator, a rotor rotatably received within the stator, and a rotational shaft passing through a center of the rotor. The stator comprises a stator core formed by a plurality of magnetic steel plates stacked in a substantially cylindrical shape, a plurality of slots circumferentially arranged at the stator core, and a plurality of coils wound around the plurality of slots.

The rotor comprises a rotor core formed with a plurality of magnetic steel plates stacked in a substantially cylindrical shape and fitted into a hollow portion formed at a center of the stator in a state of being spaced a predetermined distance from each other, a plurality of installing holes arranged in a circumferential direction within the rotor core, and a plurality of magnets respectively fitted into the plurality of installing holes, in which the rotational shaft is press-fitted into the hollow portion to rotate with the rotor.

Accordingly, when current is applied to the plurality of coils wound around the plurality of slots of the stator, the respective coils are subjected to sequential variation in polarity, so that centrifugal force is generated by virtue of a repulsive force generated when the polarity of the respective magnets of the rotor is the same as that of the respective coils of the stator and an attractive force generated when the polarity of the respective magnets of the rotor is different from that of the respective coils of the stator, whereby the rotor rotates along with the rotational shaft, and generates the rotational driving force.

However, since the conventional brushless DC motor constructed as described above is not equipped with a structure for preventing a magnetic flux from being disconnected or leaking between the respective installing holes into which the magnets are fitted, it structurally suffers a great amount of torque ripple, thereby increasing noise and vibration and deteriorating an operating efficiency.

SUMMARY OF THE INVENTION

The present general inventive concept provides a brushless DC motor to prevent disconnection of a magnetic flux and to minimize a leakage of the magnetic flux, thereby reducing torque ripple.

Additional aspects and/or advantages of the invention will be set forth in part in the description which follows and, in part, will be obvious from the description, or may be learned by practice of the invention.

these and/or other aspects of the present general inventive concept may be achieved by providing a brushless DC motor comprising a stator and a rotor, wherein the rotor comprises a rotor core, a plurality of installing holes provided in the rotor core, a plurality of magnets respectively fitted into the plurality of installing holes, and a plurality of magnetic flux-disconnection preventing holes arranged in a multilayer structure between the installing holes.

The plurality of magnetic flux-disconnection preventing holes may have a symmetrical shape at both sides about a first line connecting a center of the rotor core to a center between the installing holes.

An angle between the first line and a second line connecting the center of the rotor core to an outermost end of the plurality of magnetic flux-disconnection preventing holes is about 15~20°.

A length between an outer periphery of the rotor core and an outer periphery of the plurality of magnetic flux-disconnection preventing holes is smaller than a gap between the rotor core and the stator.

A length between each of the magnets and one of the magnetic flux-disconnection preventing holes directly facing the magnet may be smaller than a gap between the rotor core and the stator.

The foregoing and/or other aspects of the present general inventive concept may also be achieved by providing a brushless DC motor comprising a stator and a rotor which is spaced apart from the stator by a predetermined gap, and comprises a rotor core, a plurality of installing holes provided around the rotor core, a plurality of magnets respectively fitted into the plurality of installing holes, and a plurality of magnetic flux-disconnection preventing holes arranged in a multilayer structure between the installing holes.

The plurality of magnetic flux-disconnection preventing holes may be arranged in a substantially V-shape in an outer periphery of the rotor core between the installing holes.

BRIEF DESCRIPTION OF THE DRAWINGS

These and/or other aspects and advantages of the general inventive concept will become apparent and more readily appreciated from the following description of the embodiments, taken in conjunction with the accompanying drawings, of which.

DETAILED DESCRIPTION OF THE PREFERRED EMBODIMENTS

Figure 1:
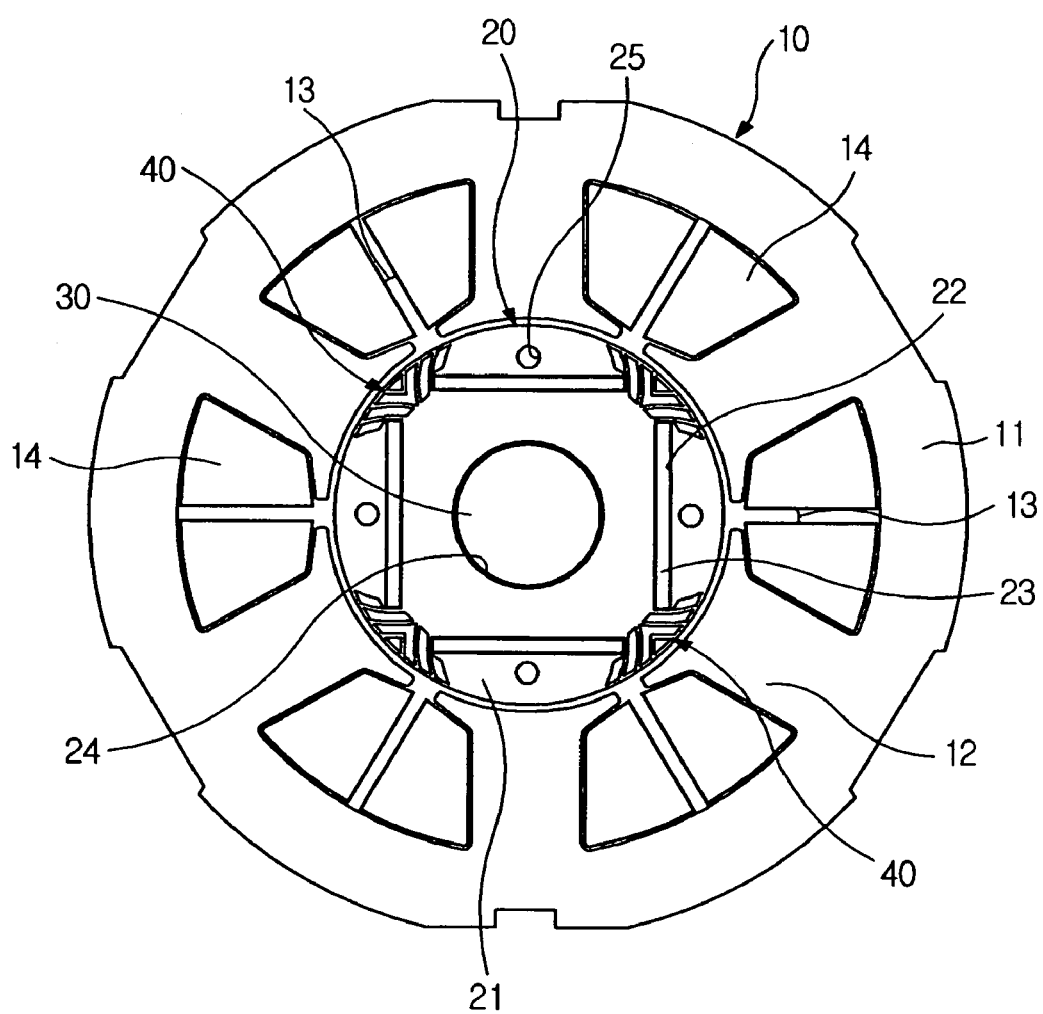
FIG. 1 is a cross-sectional view illustrating a brushless DC motor according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a cross-sectional view illustrating a brushless DC motor according to an embodiment of the present general inventive concept. As shown in FIG. 1, the brushless DC motor comprises a stator 10 having a plurality of magnetic steel plates stacked in a substantially cylindrical shape, a rotor 20 having a plurality of magnetic steel plates stacked in a substantially cylindrical shape similar to that of the stator 10 and rotatably received within the stator 10 so as to be spaced apart from the stator by a predetermined distance, and a rotational shaft 30 press-fitted into a hollow center of the rotor 20 to rotate with the rotor 20.

The stator 10 comprises a ring-shaped yoke 11 defining an outer periphery of the stator 10, a plurality of teeth 12 extending inwardly from the yoke 11 in a radial direction of the rotational shaft 30, a plurality of slots 13 formed between the respective teeth 12, and coils 14 wound around the slots 13 to form a three-phase magnetic field.

The rotor 20 comprises a substantially cylindrical rotor core 21, a plurality of installing holes 22 circumferentially arranged outside of a central region of the rotor core 21 within the rotor core 21, a plurality of magnets 23 respectively fitted into the plurality of installing holes 22, a shaft hole 24 defined at the central region of the rotor core 21 and fitted with the rotational shaft 30 such that the rotational shaft 30 rotates with the rotor 20, a plurality of rivet holes 25 respectively formed outside the plurality of installing holes 22, and a plurality of magnetic flux-disconnection preventing holes 40 formed in a multilayer structure between the installing holes 22.

The installing holes 22 having the magnets 23 fitted therein have an elongated and narrow rectangular shape, and are arranged to surround the shaft hole 24 defined at the central region of the rotor core 21. The installing holes are spaced apart from each other so that an end of one installing hole is separated from the other installing hole by a predetermined distance.

With the construction as described above, the rotor 20 is assembled in such a manner that the respective magnetic steel plates forming the rotor core 21 are engaged with each other to be coupled using rivets (not shown) inserted into the rivet holes 25 disposed outside the central region of the respective installing holes 22 having the magnets fitted therein, and circular copper plates (not shown) are then attached to upper and lower portions of the rotor 20.

The construction of the plurality of magnetic flux-disconnection preventing holes 40 will be described with reference to FIGS. 2 and 3 which are enlarged views of the rotor 20 and the magnetic flux-disconnection preventing holes 40, respectively.

Figure 2:
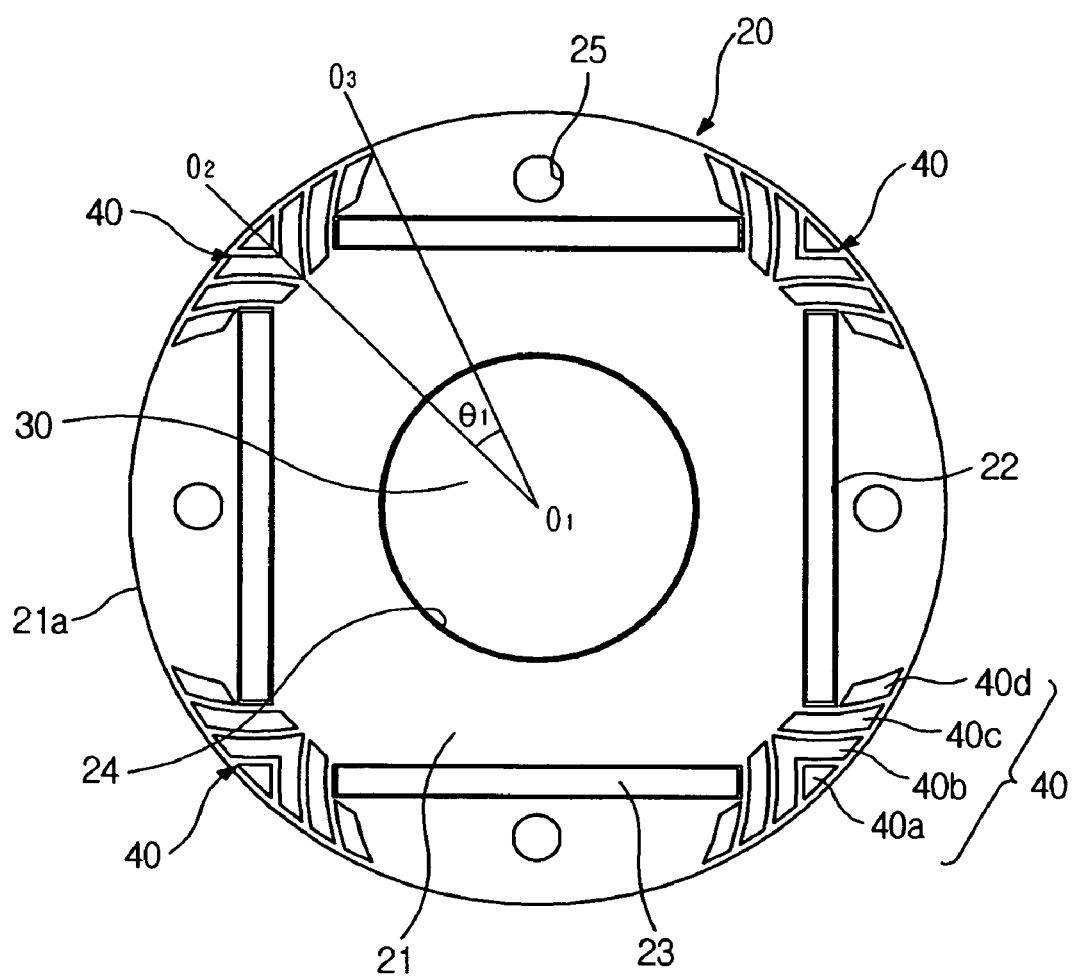
FIG. 2 is an enlarged view illustrating a rotor of the motor shown in FIG. 1.
Figure 3:
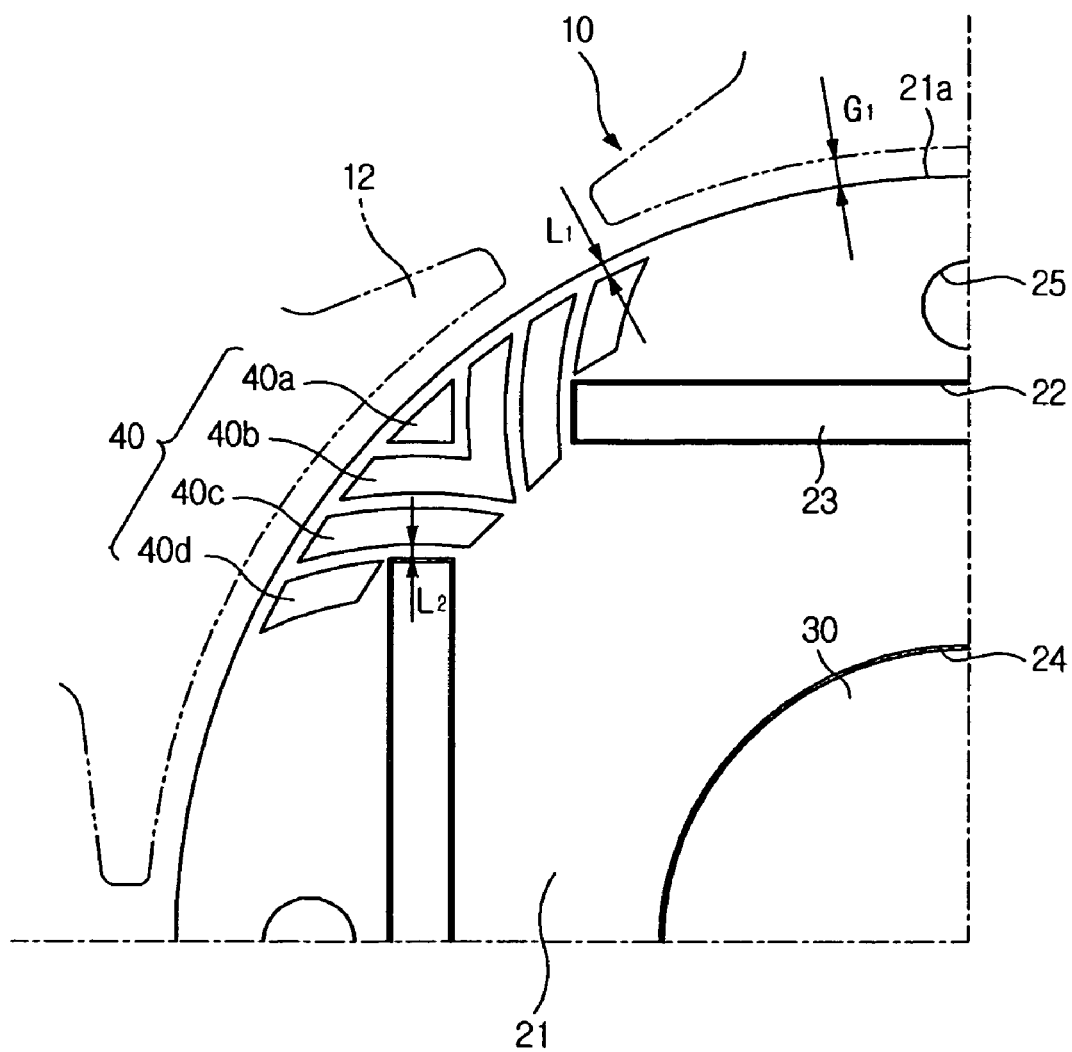
FIG. 3 is an enlarged view illustrating a plurality of magnetic flux-disconnection preventing holes of the rotor shown in FIG. 1.

As shown in FIGS. 2 and 3, the plurality of magnetic flux-disconnection preventing holes 40 formed on the rotor core 21 are disposed in an outer periphery 21a of the rotor core 21 between the installing holes 22.

Each of the magnetic flux-disconnection preventing holes 40 comprises first to fourth layers 40a, 40b, 40c and 40d constituting a multilayer structure, in which the first to fourth layers 40a, 40b, 40c and 40d are spaced by a predetermined distance from each other, and have substantially V shapes, respectively.

Here, although this embodiment describes the plurality of magnetic flux-disconnection preventing holes 40, each of which has four layers of holes or slots, the magnetic flux-disconnection preventing hole may have a different construction depending on a size of the rotor core 21 and an arrangement of the installing holes 22 or the magnets 23. The number of the plurality of magnetic flux-disconnection preventing holes 40 can be different from four, and the number of the layers of each of the plurality of magnetic flux-disconnection preventing holes 40 can be different from four.

An angle formed between a first line $0_1$-$0_2$ connecting a center of the rotor core 21 to a center between the adjacent installing holes 22 or the adjacent magnets 23 and a second line connecting the center of the rotor core 21 to an end of a corresponding one of the first, second, third, and fourth layers 40a, 40b, 40c and 40d is gradually increased from the first to the fourth layers 40a, 40b, 40c and 40d. Thus, the first layer 40a has the smallest angle formed about the first line $0_1$-$0_2$ connecting the center of the rotor core 21 to the center between the adjacent installing holes 22 or the adjacent magnets 23, and the fourth layer 40d has the largest angle. Moreover, the first and second layers 40a and 40b may have a single slot, while the third and fourth layers 40c and 40d may have a pair of slots which are disconnected from each other. The pair of slots of the third and fourth layers 40c and 40d may be disposed opposite to each other with respect to at least one of the first and second layers.

With the construction as described above, each of the magnetic flux-disconnection preventing holes 40 has a symmetrical shape at both sides about the first line 01-02 connecting the center of the rotor core 21 to the center between the magnets 23, and an angle θ1 defined between the first line $0_1$-$0_2$ and the second line $0_1$-$0_3$ connecting the center of the rotor core 21 to an outermost end of the plurality of magnetic flux-disconnection preventing holes 40 is about 15~20°.

Moreover, the plurality of magnetic flux-disconnection preventing holes 40 are constructed such that a length L1 between an outer periphery 21a of the rotor core 21 and an outer periphery of the plurality of magnetic flux-disconnection preventing holes 40 is smaller than a gap G1 between the rotor core 21 and an inner periphery of the stator 10, and such that a length L2 between each installing hole 22 or each magnet 23 and one of the magnetic flux-disconnection preventing holes 40 directly facing the installing hole 22 or the magnet 23 is smaller than the gap G1. A gap between the adjacent layers 40a, 40b, 40c and 40d may be smaller that the gap G1. A width of the layers 40a, 40b, 40c and 40d in a circumferential direction of the rotor core 21 may be smaller than that of the installing hole 22.

Here, the outer periphery of the plurality of magnetic flux-disconnection preventing holes 40 indicates a portion near to the outer periphery of the rotor core 21, and thus, an inner periphery of the magnetic flux-disconnection preventing holes 40 indicates a portion opposite to the shaft hole 24 of the rotor core 21. At least a portion of each of the plurality of magnetic flux-disconnection preventing holes 40, for example, at least a portion of at least one of the layers 40a, 40b, 40c and 40d, is disposed between ends of the adjacent installing holes 22 or the adjacent magnets 23. Also, at least a portion of at least one of the layers 40a, 40b, 40c and 40d is disposed between the outer periphery of the rotor core 21 and the installing hole 22 or the magnet 23

With the construction of the plurality of magnetic flux-disconnection preventing holes 40 as described above, a magnetic flux is effectively prevented from being disconnected between the magnets 23, leakage of the magnetic flux is minimized, and linkage of the magnetic flux is maximized.

In order to operate the brushless DC motor constructed as described above, when current is applied to the plurality of coils 14 wound around the plurality of slots 13 of the stator 11, the respective coils 14 are subjected to sequential variation in polarity, so that a centrifugal force is generated by virtue of a repulsive force generated when the polarity of the respective magnets 23 corresponding to the respective coils 14 is the same as that of the respective coils 14 and an attractive force generated when the polarity of the respective magnets 23 is different from that of the respective coils 14, whereby the rotor 20 rotates along with the rotational shaft 30, and generates rotational driving force.

During the operation of the brushless DC motor of the invention, the plurality of magnetic flux-disconnection preventing holes 40 disposed in the outer periphery 21a of the rotor core 21 between the installing holes 22 serve to prevent the disconnection of the magnetic flux while minimizing the leakage of the magnetic flux as well as maximizing the linkage of the magnetic flux, thereby minimizing the vibration and noise of the motor.

Figure 4:
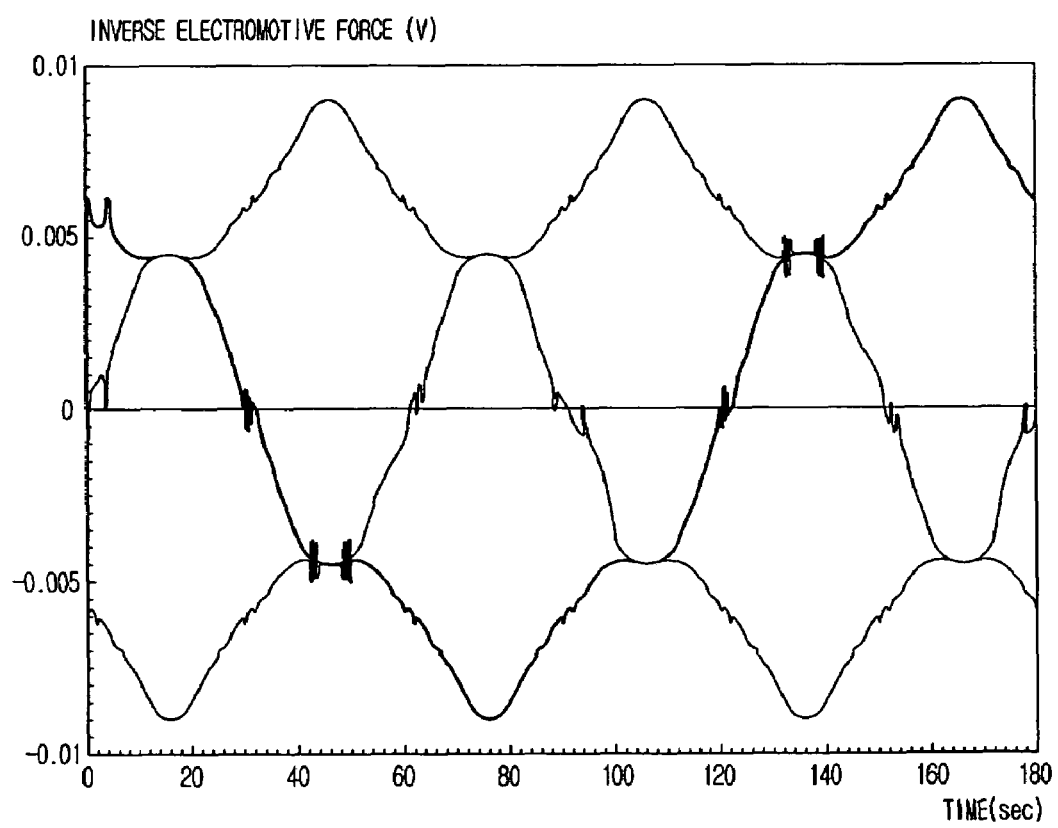
FIG. 4 is a diagram illustrating an inverse electromotive force of the brushless DC motor of FIG. 1.
Figure 5:
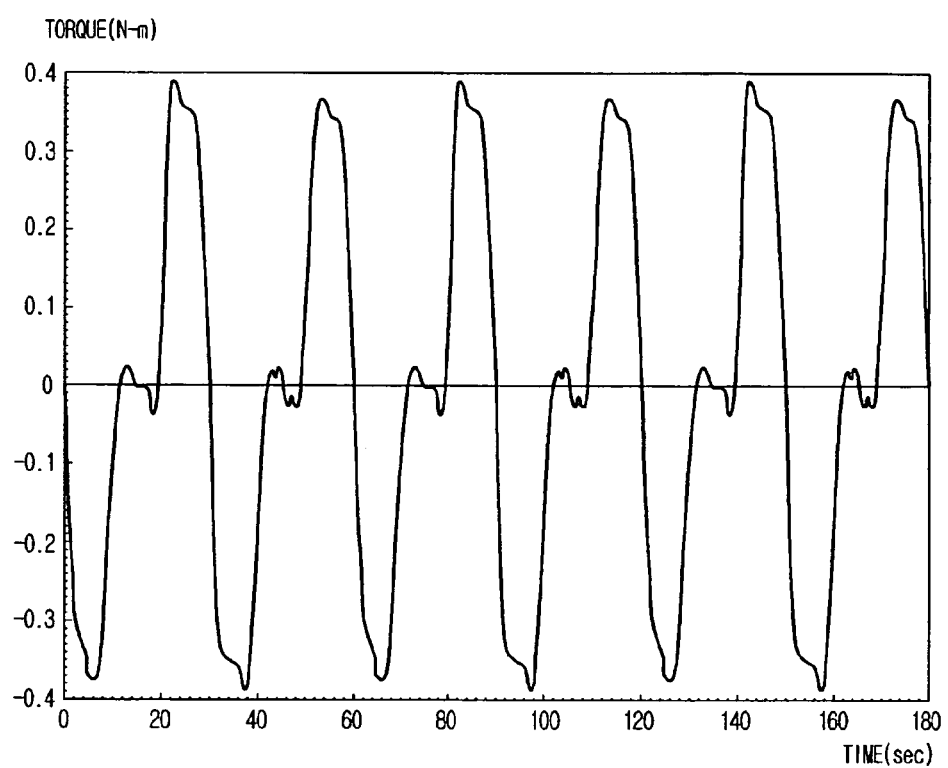
FIG. 5 is a diagram illustrating a torque of the brushless DC motor of FIG. 1.

FIGS. 4 and 5 are diagrams illustrating an inverse electromotive force and a torque of the brushless DC motor of FIG. 1.

As shown in FIGS. 4 and 5, the brushless DC motor provides an increased torque while minimizing torque ripple and cogging torque, so that it can be operated with minimized noise and vibration.

As apparent from the above description, the brushless DC motor of the present general inventive concept prevents the disconnection of the magnetic flux between the ends of the respective magnets and allows the magnetic flux to be linked through the stator, thereby decreasing the torque ripple while increasing the torque, so that the motor is operated with an enhanced operating efficiency and the minimized noise and vibration.

Although a few embodiments of the present general inventive concept have been shown and described, it would be appreciated by those skilled in the art that changes may be made in this embodiment without departing from the principles and spirit of the general inventive concept, the scope of which is defined in the claims and their equivalents.

What is claimed is:

1. A brushless DC motor, comprising:
    a stator; and
    a rotor having a rotor core, a plurality of installing holes provided circumferentially around an outer periphery of the rotor core, a plurality of magnets respectively fitted into respective ones of the plurality of installing holes such that a major face of each of the plurality of magnets is positioned horizontally flat against the outer periphery of the rotor core in the radial direction, and a plurality of magnetic flux-disconnection preventing holes arranged in a multilayer structure and in a substantially V-shape pattern between the installing holes,
    wherein at least one of the plurality of magnetic flux-disconnection preventing holes is disposed between adjacent installing holes to correspond with a first line extending from a center of the rotor core to a center between the adjacent installing holes.

2. The motor according to claim 1, wherein the plurality of magnetic flux-disconnection preventing holes have a symmetrical shape at both sides about the first line connecting the center of the rotor to the center between the adjacent installing holes.

3. The motor according to claim 2, wherein an angle between the first line and a second line connecting the center of the rotor core to an outermost end of each of the plurality of magnetic flux-disconnection preventing holes is about 15~20°.

4. The motor according to claim 1, wherein a length between an outer periphery of the rotor core and an outer periphery of the plurality of magnetic flux-disconnection preventing holes is smaller than a gap between the rotor core and the stator.

5. The motor according to claim 1, wherein a length between each of the magnets and one of the magnetic flux-disconnection preventing holes directly facing the magnet is smaller than a gap between the rotor core and the stator.

6. A brushless DC motor, comprising:
    a stator; and
    a rotor spaced apart from the stator by a predetermined gap, and having a rotor core, a plurality of installing holes provided around and substantially horizontally flat against an outer periphery of the rotor core in the radial direction, a plurality of magnets respectively fitted into the plurality of installing holes, and a plurality of magnetic flux-disconnection preventing holes arranged in a multilayer structure between the installing holes and in a substantially V-shape pattern,
    wherein at least one of the plurality of magnetic flux-disconnection preventing holes is disposed between adjacent installing holes to correspond with a radial line extending from a center of the rotor core to a center between the adjacent installing holes.

7. The motor according to claim 6, wherein when the number of the plurality of installing holes is four, the number of the plurality of magnetic flux-disconnection preventing holes is four, and the magnetic flux-disconnection preventing holes are disposed between the adjacent installing holes.

8. The motor according to claim 6, wherein each of the plurality of magnetic flux-disconnection preventing holes comprises a first portion disposed between the adjacent installing holes and a second portion disposed between an outer periphery of the rotor and a corresponding one of the installing holes.

9. The motor according to claim 6, wherein each of the plurality of magnetic flux-disconnection preventing holes comprises a plurality of layers spaced-apart from each other by a second gap smaller than the predetermined gap.

10. The motor according to claim 6, further comprising:
    a shaft hole formed on a center of the rotor core; and
    a rotational shaft inserted into the shaft hole to rotate together with the rotor core,
    wherein the multilayer structure of the plurality of magnetic flux-disconnection preventing holes is disposed in an angle of about 15~20° in a circumferential direction of the rotation shaft.

11. The motor according to claim 6, wherein the multilayer structure of the plurality of magnetic flux-disconnection preventing holes comprises a first hole disposed on the radial line connecting the center of the rotor core and the center of the adjacent installing holes, a second hole having end portions disposed opposite to the first hole and a middle portion connecting the end portions and disposed on the line, third holes disposed opposite to each other with respect to the line, and fourth holes disposed opposite to each other with respect to the line.

12. The motor according to claim 11, wherein adjacent ones of the first, second, third, and fourth holes are spaced apart from each other by a distance smaller than the predetermined gap.

13. The motor according to claim 11, wherein at least a portion of the second and third holes is disposed between the adjacent installing holes.

14. The motor according to claim 6, wherein the multilayer structure of the plurality of magnetic flux-disconnection preventing holes comprises a plurality of holes having different lengths in a radial direction of the rotor core.

15. A brushless DC motor, comprising:
a stator; and
a rotor, comprising:
   a plurality of magnets disposed around an outer periphery of the rotor, each having a major face thereof positioned horizontally flat against the outer periphery of the rotor core in the radial direction, and
   a plurality of magnetic flux-disconnection preventing holes disposed between adjacent magnets, wherein at least one of the plurality of magnetic flux-disconnection preventing holes is disposed to correspond with a first line extending from a center of the rotor core to a center between the adjacent magnets.

16. The brushless DC motor of claim 15, wherein the plurality of magnetic flux-disconnection preventing holes are arranged in a substantially V pattern, having at least two of the magnetic flux-disconnection preventing holes disposed between ends of adjacent magnets, and at least one magnetic flux-disconnection preventing holes disposed between the major face of the magnet and the outer periphery of the rotor core.

* * * * *